Nov. 15, 1955  T. C. MORRIS ET AL  2,723,934
POROUS RUBBER MATERIALS
Filed Oct. 5, 1953  2 Sheets-Sheet 1
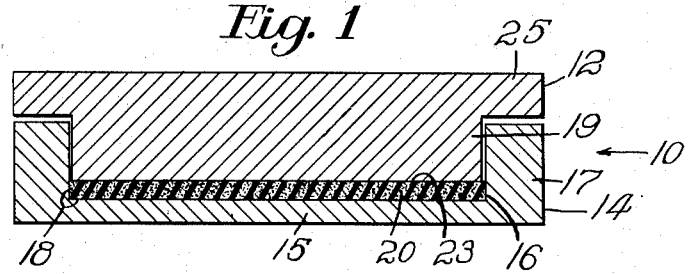
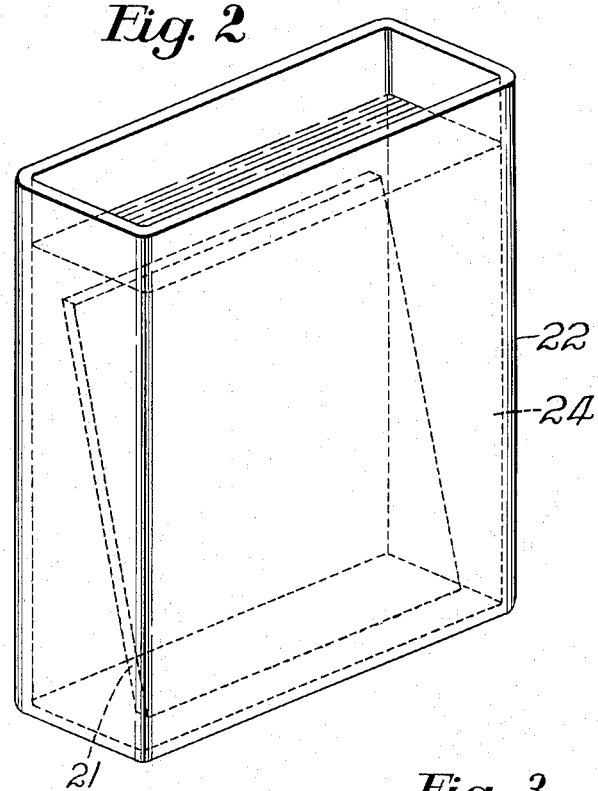
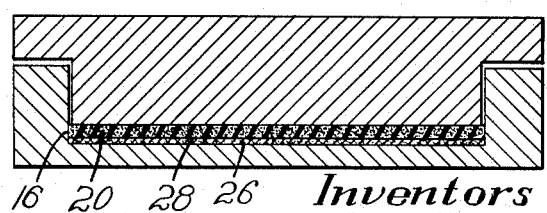
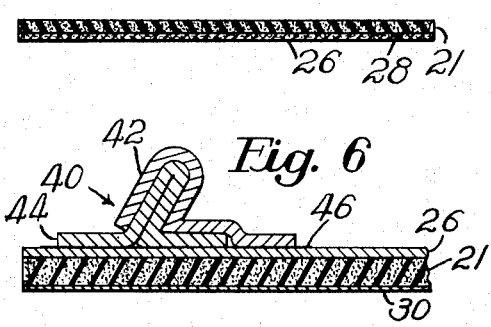
Inventors
Adolph M. Chaplick
Thomas C. Morris
By their Attorney

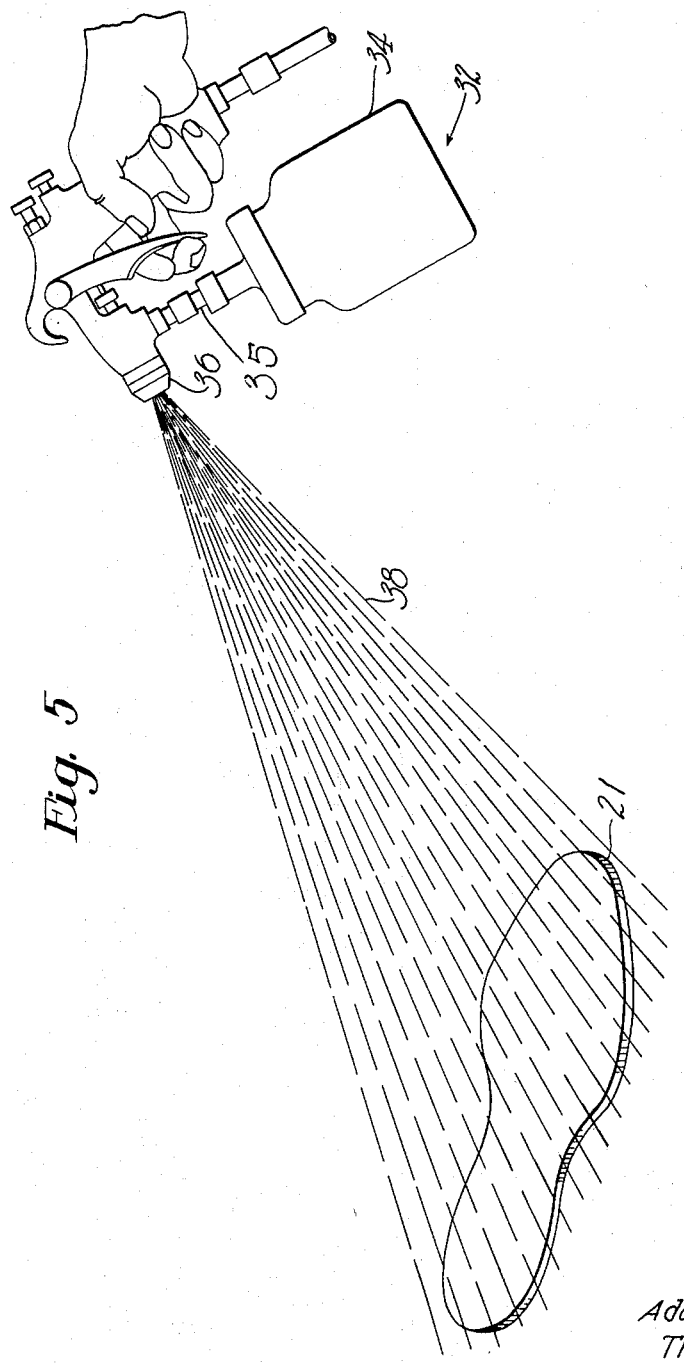

United States Patent Office 2,723,934
Patented Nov. 15, 1955

2,723,934

POROUS RUBBER MATERIALS

Thomas C. Morris, Lexington, Mass., and Adolph M. Chaplick, Hudson, N. H., assignors to B. B. Chemical Co., Boston, Mass., a corporation of Massachusetts Application October 5, 1953, Serial No. 384,035

9 Claims. (Cl. 154—100)

This invention relates to porous, resilient articles prepared from vulcanized rubber and more particularly to porous sheet materials possessing characteristics useful for the insoles of shoes, and a method for making the same.

Porous materials having a high degree of resilience and strength are needed for many articles such as filter elements, shoe parts, furniture cushions or padding, insulation and the like. For example, leather has long been a preferred porous material for shoe insoles because of its ability to transpire water vapor and air and because of its high strength. However, leather is subject to attack by perspiration acids and by bacteria and mold, and efforts have been made to replace it with porous plastic or rubber materials. Porous material suggested for use in making insoles include porous rubber sheets formed by solidifying a foamed rubber latex or by expanding solid rubber with the aid of chemical blowing agents and porous vinyl resin sheets made by sintering particles of vinyl resin under heat and pressure. Each of these types of porous sheet requires relatively expensive raw materials, e. g., rubber latex, raw rubber or vinyl resins, and the sheet formed with the aid of a blowing agent often has objectionable color and odor characteristics.

It is a feature of the present invention to provide a new, inexpensive, porous, resilient material and a method of making the same using already vulcanized rubber, e. g., scrap rubber, as a raw material.

In accordance with the present invention, fine particles of vulcanized rubber such as graded commercial rubber scrap are formed into a continuous porous body by subjecting a mass of such particles to heat and pressure to cause the particles to cohere and thereafter depositing an adhesive reinforcing substance within the interstices of the porous body to form a further link between the particles to hold them more strongly together. The new porous, resilient material so produced possesses unexpected strength due to the special action of the adhesive reinforcing substance within its interstices which not only provides additional links supplementing the cohesive self bonds between the sintered rubber particles but also serves to distribute disruptive forces applied to the material and eliminate sharply localized stresses which might rupture the bonds between particles.

The invention will be further described in connection with the accompanying drawings forming a part of the disclosure, in which Fig. 1 is a sectional view showing a layer of rubber particles compressed in a mold for sintering into a sheet;

Fig. 2 is an angular view of an impregnating tank illustrating the step of immersing a sintered sheet in a bath of latex;

Fig. 3 is a view similar to Fig. 1 showing a layer of rubber particles in contact with a fibrous sheet under compression in a mold for sintering the particles into a sheet and uniting the sintered sheet with the fibrous sheet;

Fig. 4 is a sectional view of a sintered sheet combined with a fibrous backing;

Fig. 5 is a view illustrating the spray application of a coating to an insole surface; and Fig. 6 is a sectional view of the margin of a ribbed insole comprising a sintered sheet having attached to it a porous layer and a fibrous backing.

The new porous material of the present invention is a body of small particles of vulcanized rubber cohering together at their points of contact with the self bond resulting from application of heat to the particles. Although it is generally considered that vulcanization renders a rubber non-thermoplastic, we have found that sufficient flow or surface interaction occurs when the particles are heated to knit or sinter the particles together into a coherent mass in which the particles retain essentially their original shape. The joints between the cohered vulcanized rubber particles, however, provide quite sharp angles which localize stresses and tend to initiate tearing when the body of particles is bent or stretched. To avoid this undesired behavior reinforcing substance is deposited in the interstices of the sintered body by impregnating the body with a liquid solution or dispersion of the reinforcing substance in a volatile liquid vehicle. Fillets of reinforcing substance are formed in the angles between particles and there is provided an additional bond linking the particles more firmly together.

A wide variety of rubber materials may be used to prepare the sintered sheet of the present invention including natural rubber and the vulcanized forms of synthetic rubbers, such as polymers of chlorobutadiene and copolymers of butadiene and styrene, butadiene and acrylonitrile, or butadiene and isobutylene, as well as other synthetic rubbers. These materials are suitable for use as raw materials either alone or in combination. In the practice of this invention the material used will ordinarily be vulcanized rubber scrap. The nature of the original rubber is not critical and graded commercial rubber scrap has been found satisfactory. The term "graded commercial rubber scrap" is used in its commonly accepted sense to refer to a vulcanized rubber scrap of substantially uniform composition. The economy of the products of the present process is due in part to the fact that such inexpensive rubber scrap or "springs," which may or may not contain fillers, can be employed. It is preferable but not essential that such scrap be relatively free of fiber to facilitate comminution.

The selected rubber may be comminuted in any convenient manner. In accordance with the preferred technique the material is passed between the closely spaced rolls of a rubber mill which crushes the material and forms it into a thin, crumbly sheet. The sheeted material is then ground in a hammer mill type grinder, such as a Raymond Pulverizer Hammer Mill, until the resulting powdered particles will pass through a ten mesh screen. This limitation of size is not a strict one but if larger particles are employed the resulting porous material will have a less uniform appearance and feel which may be objectionable in some uses of the material, such as insoles for shoes.

In some instances, and particularly when highly loaded scrap rubbers which resist sintering due to their low degree of tackiness are employed, it has been found desirable to incorporate a small amount of a plasticizer, such as a mineral oil, into the rubber powder. The plasticizer may be incorporated by stirring the powder and slowly adding the desired amount of plasticizer to it so that the liquid is imbibed uniformly by the rubber. Heat may be employed to aid in mixing the powder and plasticizer.

The rubber particles with or without added plasticizer are heated to sinter them together into a continuous body in which the particles are self bonded. The sintering step may be performed with or without compression of the body of particles. The porosity and firmness of the resulting sheet will depend in large measure upon the application or lack of application of compression during the heating process, with higher compression giving greater density and correspondingly less porosity in the molded sheet. The sintering is ordinarily effected by placing a body of rubber particles in the cavity 16 of a mold such as that indicated generally at 10 in Fig. 1. The mold comprises a female member 14 having a base 15, side walls 17 and smooth surfaces 18 defining the mold cavity 16 and a male member 12 having a plug portion 19 fitting within the side walls 17, a smooth surface 23 opposite the smooth bottom surface 18 of the female member 14 and a rim portion 25 which extends over the side walls 17 of the female member. Compression and heating of the layer of rubber particles 20 are effected by placing the mold containing the layer of rubber particles in a press with heated platens such as a hydraulic press with platens cored for introduction of steam or water. The time required for molding the sheet depends upon the thickness of the rubber particle layer and upon the nature of the particles and of the mold. A typical sintering operation involves loosely packing a layer of rubber particles in a mold, placing the mold between the platens of a press, compressing the layer to approximately ½ of its original loose-packed thickness and supplying steam at 100 lbs. pressure to the cored platens of the press in which the mold is contained. A coherent porous sheet having a remarkable degree of permeability to air and moisture vapor is formed in a pressing period of from seven to 15 minutes. After the sintering of the rubber particles the sintered sheet is cooled for five minutes during which time cold water is circulated through the platens of the press. Thereafter the mold is removed from the press and the sintered sheet is taken out of the mold.

The porous sheet obtained by sintering, as above described, has a high degree of strength in consideration of its being formed of rubber which has been vulcanized previous to the sintering. For many purposes, however, it is desirable to reinforce the sheet. It should be noted here that any reinforcing procedure which would result in a substantial lessening of the porosity of the sheet would destroy a primary advantage of the material, i. e., its ability to transpire water vapor and air. We have found that the strength of the base sheet can be increased without materially reducing its porosity by depositing a reinforcing substance within the interstices of the porous sheet from a liquid medium. The increase in strength is obtained particularly if the joints between the particles are extended in magnitude by having the reinforcing substance adherent to and linking the particles which comprise the porous sheet.

Natural or synthetic rubber latices have been found useful for depositing a reinforcing substance uniformly within a porous material such as the porous sheet described above. It is preferred to use latices having relatively low rubber solids content and a high proportion of wetting agent. A reinforcing substance deposited from such latices within the interstices of the sintered material gives a strong reinforcing action and does not materially lessen the porosity of the product. Substitution of low solids content solutions of rubbers in volatile organic solvents for latices results in the obtaining of products similar to those achieved with the latices. Compounding of the rubber impregnant with vulcanizing ingredients and subsequent vulcanization of the deposited rubber composition has been found to result in a further increase in the strength and resiliency of the porous material. This improvement may be due to two factors, e. g., the strengthening action of the reinforcer which results from its vulcanization, and the minimizing of the tendency of the reinforcing substance to bond to itself when the sheet is compressed.

The impregnation of the sintered sheet with a reinforcing substance may be effected by immersion of the sheet 21 in a bath of a suitable liquid impregnant 24 in a tank 22 (see Fig. 2). The immersion is continued until the impregnant has penetrated throughout the pores of the sheet, after which the sheet is removed and permitted to dry. When vulcanizing agents are employed with the impregnant, any known vulcanization procedure may be used to cure the reinforcing substance deposited from the impregnant, but open steam vulcanization is a preferred method.

The reinforcing substance deposited within the interstices of the sintered material as described above extends between and provides an additional link which supplements the self bond already existing between the particles which make up the sintered material. Likewise, since the reinforcing substance has been deposited from a liquid it fills in any crevices and extends in a smooth curve between the particles to distribute stresses which are applied to the sintered material, thereby reducing the tendency of the sintered material to tear when it is subjected to such forces.

A porous sheet of sintered material such as that obtained by the above sintering and reinforcing method may be employed as an insole directly, but it is ordinarily desirable to back the porous sheet with a reinforcing fibrous sheet and to provide a smooth, slippery top surface to it.

A fibrous backing sheet may be combined with a porous sheet by any suitable method such as one of the two following techniques.

The preferred method for bonding a porous sintered rubber sheet to a fibrous sheet comprises applying a non-continuous coating of an adhesive to one surface of the fibrous sheet, drying the coating, and assembling the coated sheet with a sheet of porous sintered rubber which has been impregnated and only partially dried and therefore is in a tacky state. A bond is effected between the sheets when a slight pressure is applied to them by rolling or pressing them together.

Another suitable method for combining a fibrous backing sheet with the porous sheet (see Fig. 3) involves the steps of coating a fibrous sheet 26 on one side with a non-continuous deposit 28 of a material which acts as an adhesive for it and for the rubber material to be sintered. The coated sheet is then deposited in the cavity of the compression mold 10 with its adhesive coated side facing up and a layer of rubber powder 20 to be sintered is disposed in the mold cavity 16 on top of the fibrous sheet and in contact with the adhesive. The mold is closed, placed in a press and subjected to heat and pressure to sinter the rubber as previously described. The heat and pressure also cause the rubber material to bond strongly to the fibrous sheet to form a laminated sheet. The laminated structure, shown in Fig. 4, having a sintered member 21, an adhesive layer 28, and a fibrous member 26, is removed from the mold upon completion of the molding process.

Where it is desired to provide a smooth, slippery top surface to a sintered rubber sheet, an adherent porous layer of a material which is hard at body temperature is secured to it.

In the preferred method a coating material is sprayed onto an insole of porous sintered rubber to provide a porous layer thereon. This method is described fully in the copending patent application Serial No. 227,904, filed May 23, 1951, in the names of T. C. Morris and E. A. Chandler. As described in that application, a solution or dispersion of a material from a tank 34 (see Fig. 5) is supplied through tube 35 of the spray gun 32 and is sprayed from the nozzle 36 of the gun in the form of a dusty type of spray 38 onto the surface of the porous sheet 21. This result may be obtained by holding the gun at an angle a distance from the surface of the insole such that the coating material impinges upon the porous sheet in the form of semi-dry discrete particles, and a non-continuous permeable coating is formed. It is preferred that the coating agent should be one that is adherent and hard at body temperature in order that the advantage of slip which is imparted to the final, permeable product may be retained during wear of the shoe in which the insole formed of the coated sheet is placed.

In an alternative method for obtaining a smooth, slippery top surface of a shoe insole composed of the material of the present invention, a permeable sock lining of the type commonly employed in shoemaking is bonded to the foot facing surface of the insole. By this means an insole is obtained in which the advantages resulting from the permeability of the sintered sheet are retained.

The sheet material of the present invention can be employed as insoles in shoes in any of the conventional shoemaking processes. In using the Goodyear welt process with such insoles, a stuck-on rib, preferably such as that disclosed in United States Letters Patent No. 2,458,500, granted January 11, 1949, in the names of F. E. Bertrand et al., is provided on the bottom surface of the insole blank. This is illustrated in Fig. 6 where an insole comprising a sintered sheet 21 having a permeable surface layer 30, a fibrous reinforcing member 26, and a stuck-on rib 40 is shown. The rib comprises the two fabric elements 42 and 44 which are bonded to each other and to the fibrous backing element 26 by means of an adhesive 46. An alternative satisfactory method for providing a rib on an insole is that disclosed in United States Letters Patent No. 2,255,353, granted September 9, 1941, to S. M. Griswold. In this method an insole is channeled to provide an upstanding rib and a reinforcing strip of fabric is bonded to the inner face of the rib and the adjacent surface of the insole.

The following examples of porous materials are given for purposes of illustration only to aid in understanding the invention and it is to be understood that the invention is not restricted to the specific materials, proportions of ingredients or operational details described herein.

EXAMPLE 1

Graded commercial rubber scrap was passed once through the rolls of a rubber mill placed close together so that a thin, loose sheet was derived. This sheet was then ground in a Raymond Pulverizer Hammer Mill until a twenty-mesh powder was obtained. The powder 20 was sifted into the cavity 16 of the female mold member 14 to a depth of 0.25", as shown in Fig. 1. The male mold member 12 was then placed on top of this powder and the mold unit was positioned in a hydraulic press which was used to compress the powder 20 in the mold to a thickness of 0.125". The platens of the press were heated by steam at a pressure of 100 lbs. per square inch. The mold was permitted to remain in the press for fifteen minutes. During the first ten minutes of this period heat was applied to the mold platens, while during the remaining five minutes cold water was circulated through the press platens. At the end of this fifteen minute cycle, the mold was removed from the press. The sheet 21 was removed from the mold 10 and was impregnated as shown in Fig. 2 by immersing the sheet 21 in a 30% solids natural rubber latex 24, which latex contained vulcanizing ingredients and a high proportion of a wetting agent. The latex employed was:

*Compounded latex*

| | |
|---|---|
| 60% natural rubber latex | 250 |
| Water | 250 |
| Tergitol #7 | 10 |
| Vulcanizing dispersion [1] | 12 |

[1] Vulcanizing dispersion:

| | |
|---|---|
| Water | 3.66 |
| Zinc oxide | 1.0 |
| Sulfur | 1.0 |
| Ethyl zimate | 1.0 |
| Agerite White | 1.0 |
| Darvan #1 | 0.12 |
| Casein | 0.12 |
| Caustic soda (tech.) | 0.1 |

The Tergitol #7 is a higher sodium alkyl sulphate and is employed as a wetting agent.

The ethyl zimate is zinc diethyldithio-carbamate and is employed as a rubber accelerator.

The Darvan #1 is a sodium salt of a polymerized alkyl aryl sulphonic acid and is employed as a water soluble latex dispersing agent.

The agerite white is symmetrical di-beta-naphthyl-paraphenylenediamine and is employed as a rubber antioxidant.

The impregnated sheet was removed from the impregnating bath and dried in an oven at 160° F. for one and a half hours and the rubber impregnant deposited within the sheet was then vulcanized by open steam vulcanization for thirty-five minutes. The resulting resilient structure was found to contain 12% by weight of the impregnant.

A light, non-continuous coating of 60% natural rubber latex was then sprayed onto one surface of the sintered sheet and a like coating was applied to one surface of a Texon sheet. The Texon is a latex impregnated fibrous sheet material. These coatings were dried until the rubber was tacky and the sheets were then assembled with their cemented sides in contact. Pressure was then applied to the assembled sheets with a hand roller so that a bond between the sheets was effected.

This porous rubber sheet was sprayed on its free side with a 25% solution of Pliolite S-5 in toluene, as shown in Fig. 5, by holding the spray gun 32 at an angle of approximately 45° to the plane of the surface of the insole 21 so that the resin spray 38 impinged upon the surface of the sheet somewhat in the form of semi-dry particles and little or no impregnation of the resin into the pores of the sheet occurred. The Pliolite S-5 is a thermoplastic, hard, non-oxidizing butadiene-styrene copolymer resin. The air and water vapor permeabilities of the coated and reinforced sheet were not substantially less than the corresponding permeabilities of the uncoated sheet.

The coated and reinforced sheet was died into insole blanks and, as shown in Fig. 6, stuck-on ribs 40 were cemented to the fibrous reinforcing member 26. The insoles so produced were used in shoes prepared by the Goodyear welt process. Wearers of the shoes reported that the insoles were extremely pleasing in comfort characteristics and it was observed that the mold growth commonly encountered with leather insoles did not occur.

EXAMPLE 2

Graded commercial rubber scrap was passed once through closely spaced rolls of a rubber mill and the loose sheet derived was ground to a forty-mesh powder in a Raymond Pulverizer Hammer Mill. The powder thus obtained was blended with 5% by weight of Nujol, a mineral oil which acts as a plasticizer for the rubber, by tumbling the powder in a metal container and adding the mineral oil to it during this period of agitation. Mixing was continued for fifteen minutes after addition of the oil to the rubber was completed. The plasticized powder was then molded as was the rubber powder in Example 1.

The resulting sheet was then reinforced with a rubber from a latex by a technique similar to that explained in Example 1, but in this instance a compounded Neoprene latex was employed as an impregnant. The latex employed was:

| | |
|---|---|
| 35% solids neoprene latex | 300.00 |
| Petrolatum | 3.0 |
| Zinc oxide | 7.50 |
| Antioxidant 2246 | 2.00 |
| Thiocarbanilide | 2.00 |
| Sulfur | 2.00 |
| Tepidone | 2.00 |

The neoprene latex is a water dispersion of polychlorobutadiene synthetic rubber.

The antioxidant 2246 is a non-discoloring antioxidant for neoprene and is employed as such.

The thiocarbanilide is an accelerator and is employed to promote the cure of the neoprene.

The tepidone is an aqueous solution of sodium dibutyl dithio carbamate and is employed as an accelerator for the cure of the neoprene.

The neoprene impregnant was cured by an open steam vulcanization technique similar to that employed in Example 1. Approximately 14% of the impregnant was found to have been deposited throughout the sheet. A Texon backing element was bonded to one surface of the sheet by the procedure employed in Example 1 for effecting such a bond.

This backed sheet was then died into insoles, and a light non-continuous coating of 60% natural rubber latex was sprayed onto the foot facing surface of the insoles and allowed to dry until the deposited rubber was tacky. Faille cloth sock linings were then pressed onto the insoles with a hand roller to bond the sock linings to the insoles. Shoes were prepared with the backed and sock lining covered insoles by the cement shoe process. The shoes were reported by wearers to be comfortable and mold growth was not observed in the shoes.

Having described our invention, what we claim as new and desire to secure by Letters Patent of the United States is:

1. A porous article of manufacture comprising a body of self-bonded coherent particles of graded commercial rubber scrap and an adhesive reinforcing substance within the interstices of the body adherent to and providing an additional bond linking said particles.

2. A porous sheet material specially adapted for the construction of insoles comprising a body of self-bonded sintered-together particles of graded commercial rubber scrap and an adhesive reinforcing substance within the interstices of the body adherent to and providing an additional bond linking said particles.

3. A porous sheet material specially adapted for the construction of insoles comprising a body of self-bonded sintered-together particles of graded commercial rubber scrap, an adhesive reinforcing substance within the interstices of the body adherent to and providing an additional bond linking said particles, and a permeable layer of material which is hard at body temperature adherent to a surface of said sheet.

4. A method for preparing a porous material which comprises sintering together particles of graded commercial rubber scrap into a porous self-bonded coherent mass wherein the joints between the particles have sharp angles and crevices, impregnating said porous mass with a volatile liquid vehicle carrying an adhesive reinforcing substance, and removing said liquid to deposit said reinforcing substance within the interstices of said porous coherent mass to cause said reinforcing substance to adhere to and provide an additional bond to link said particles more firmly together.

5. A method for preparing a porous sheet material specially adapted for the construction of insoles which comprises applying heat and pressure to a mass of particles of graded commercial rubber scrap to sinter them together into a porous self-bonded coherent mass, impregnating said porous mass with an aqueous dispersion of an adhesive reinforcing substance, removing the water from said dispersion to deposit said reinforcing substance within the interstices of said porous coherent mass to cause said reinforcing substance to adhere to and provide an additional bond to link said particles more firmly together and securing a permeable adherent layer of a material which is hard at body temperature to at least one surface of said porous sheet material.

6. A method for preparing a porous material which comprises sintering together particles of graded commercial rubber scrap, said particles having a diameter no greater than 10 mesh, into a porous self-bonded coherent mass wherein the joints between the particles have sharp angles and crevices, impregnating said porous mass with a volatile organic solvent solution of a rubbery adherent reinforcing substance and removing the solvent to deposit said reinforcing substance within the interstices of said porous coherent mass to cause said reinforcing substance to adhere to and provide an additional bond to link said particles more firmly together.

7. A method for preparing porous sheet materials specially adapted for the construction of insoles which comprises sintering together particles of graded commercial rubber scrap, said particles having a diameter of not greater than 10 mesh, into a porous self-bonded coherent mass by the application of heat and pressure, impregnating said porous mass with a volatile organic solvent solution of an adhesive reinforcing substance, removing the solvent from said solution to deposit said reinforcing substance within the interstices of said porous coherent mass to cause said reinforcing substance to adhere to and provide an additional bond to link said particles more firmly together and securing a permeable adherent layer of a material which is hard at body temperature to at least one surface of said porous sheet material.

8. A method for preparing porous sheet materials specially adapted for the construction of insoles which comprises applying heat and pressure to a mass of particles of vulcanized rubber, said particles having a diameter of not greater than 10 mesh to sinter them together into a porous self-bonded coherent mass, impregnating said porous mass with a rubber latex, removing the water from said latex to deposit rubber from said latex within the interstices of said porous coherent mass to cause the rubber from said latex to adhere to and provide an additional bond to link said particles more firmly together and securing a permeable adherent layer of a material which is hard at body temperature to at least one surface of said porous sheet material.

9. A method for preparing porous sheet materials specially adapted for the construction of insoles which comprises disposing a mass of particles of graded commercial rubber scrap in contact with a fibrous material having on it a permeable layer of adhesive on the surface of said fibrous material which contacts said particles, applying heat and pressure to said particles to sinter them together into a porous self-bonded coherent mass and to join the porous mass to the fibrous material, impregnating said porous mass with a rubber latex, and removing the water from said latex to deposit rubber from said latex within the interstices of said porous coherent mass to cause said reinforcing substance to adhere to and provide an additional bond to link said particles more firmly together.

References Cited in the file of this patent

UNITED STATES PATENTS

| | | |
|---|---|---|
| 1,651,567 | Wilderman | Dec. 6, 1927 |
| 1,980,227 | Repony | Nov. 13, 1934 |
| 2,297,248 | Rudolph | Sept. 29, 1942 |
| 2,465,493 | Strickhouser | Mar. 29, 1949 |